(12) United States Patent
Weiberle et al.

(10) Patent No.: US 8,196,027 B2
(45) Date of Patent: Jun. 5, 2012

(54) METHOD AND DEVICE FOR COMPARING DATA IN A COMPUTER SYSTEM HAVING AT LEAST TWO EXECUTION UNITS

(75) Inventors: Reinhard Weiberle, Vaihingen/Enz (DE); Bernd Mueller, Leonberg-Silberberg (DE); Eberhard Boehl, Reutlingen (DE); Yorck von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 749 days.

(21) Appl. No.: 11/990,250

(22) PCT Filed: Jul. 27, 2006

(86) PCT No.: PCT/EP2006/064730
§ 371 (c)(1),
(2), (4) Date: Mar. 18, 2009

(87) PCT Pub. No.: WO2007/017395
PCT Pub. Date: Feb. 15, 2007

(65) Prior Publication Data
US 2009/0210777 A1 Aug. 20, 2009

(30) Foreign Application Priority Data

Aug. 8, 2005 (DE) .................. 10 2005 037 217

(51) Int. Cl.
*G06F 7/02* (2006.01)
*H03M 13/00* (2006.01)

(52) U.S. Cl. .................. 714/819; 714/736; 712/215
(58) Field of Classification Search .................. 714/11, 714/736, 819; 712/215
See application file for complete search history.

(56) References Cited

U.S. PATENT DOCUMENTS

| | | | | |
|---|---|---|---|---|
| 5,243,607 A | * | 9/1993 | Masson et al. | 714/49 |
| 5,572,662 A | * | 11/1996 | Ohta et al. | 714/11 |
| 6,092,217 A | * | 7/2000 | Kanekawa et al. | 714/11 |
| 7,290,169 B2 | * | 10/2007 | Safford et al. | 714/11 |
| 2003/0005380 A1 | * | 1/2003 | Nguyen et al. | 714/736 |
| 2005/0108509 A1 | * | 5/2005 | Safford et al. | 712/215 |

FOREIGN PATENT DOCUMENTS

| | | |
|---|---|---|
| CN | 1538299 | 10/2004 |
| EP | 1 469 390 | 4/2004 |
| JP | 2000-148524 | 5/2000 |
| JP | 2000-181737 | 6/2000 |
| JP | 2001-238094 | 8/2001 |
| WO | WO99/66405 | 12/1999 |
| WO | WO2005/003962 | 1/2005 |

* cited by examiner

*Primary Examiner* — Sam Rizk
(74) *Attorney, Agent, or Firm* — Kenyon & Kenyon LLP

(57) ABSTRACT

A method for comparing data in a computer system having at least two execution units, the comparison of the data taking place in a comparison unit and each execution unit processing input data and generating output data, wherein one execution unit specifies to the comparison unit that the next piece of output data is to be compared to a piece of output data of the at least second execution unit, and thereupon a comparison of the at least two output data takes place.

23 Claims, 3 Drawing Sheets

METHOD AND DEVICE FOR COMPARING DATA IN A COMPUTER SYSTEM HAVING AT LEAST TWO EXECUTION UNITS

FIELD OF THE INVENTION

The present invention relates to a method and a device for comparing output data of at least two execution units of a microprocessor.

BACKGROUND INFORMATION

Transient errors, triggered by alpha particles or cosmic radiation, are an increasing problem for integrated circuits. Due to declining structure widths, decreasing voltages and higher clock frequencies, there is an increased probability that a voltage spike, caused by an alpha particle or by cosmic radiation, will falsify a logical value in an integrated circuit. The effect can be a false calculation result. In safety-related systems, such errors must therefore be detected reliably.

In safety-related systems, such as an ABS control system in a motor vehicle, in which malfunctions of the electronic equipment must be detected with certainty, redundancies are normally provided for error detection, particularly in the corresponding control devices of such systems. Thus, for example, in known ABS systems, the complete microcontroller is duplicated in each instance, all ABS functions being calculated redundantly and checked for consistency. If a discrepancy appears in the results, the ABS system is switched off.

Such processor units having at least two integrated execution units are also known as dual-core architectures or multi-core architectures. The different execution units (cores) execute the same program segment redundantly and in a clock-synchronized manner; the results of the two execution units are compared, and an error will then be detected in the comparison for consistency.

SUMMARY OF THE INVENTION

If today's dual-core processors are to work in a comparison mode, the cores, or rather the execution units have to be identical to the greatest extent possible, so that the output signals are able to be compared in each clock pulse. However, with regard to certain security aspects, it is also advantageous if diversitary execution units are used. If the execution units are diversitary, however, the output signals of these execution units are no longer able to be compared in each clock pulse.

It is an object of the present invention to compare the output signals of diversitary execution units. The present invention attains this object by the introduction of a control signal by which an execution unit signals a comparison unit that the piece of data output with this signal is to be compared to the piece of data of the other execution unit. Diversitary execution units and diversitary software may be used for this. Only the data to be compared and their format have to be comparable. It depends on the respective implementation, of the invention described here, whether the sequence in which the data, that are to be compared, are transmitted to the comparison unit also has to be identical.

One of the execution units advantageously specifies to the comparison unit that the next output piece of data is to be compared to an output piece of data of the at least second execution unit, and thereupon a comparison of the at least two output data takes place. The at least two execution units expediently process the input data independently of each other. A specification that the next piece of output data is to be compared advantageously takes place by a comparison signal. The comparison signal and the output piece of data that is to be compared are advantageously output in a mutually unequivocally assignable manner. An identifier is expediently assigned to a piece of data that is to be compared, by which the comparison is triggered. All execution units whose output data are to be compared advantageously signal this to the comparison unit. The output data that are to be compared are buffered via at least one buffer memory in a specifiable sequence. One of the execution units advantageously specifies to the comparison unit that the next piece of output data is to be compared to a piece of output data of the at least second execution unit, and thereupon a comparison of the at least two output data takes place. In the device, advantageously at least one buffer memory is provided, which is developed in such a way that the data are buffered in a specifiable sequence and are then able to be supplied to the comparison unit. The buffer memory is advantageously a FIFO memory. This is advantageously implemented in a device as well as a computer system including this device.

DETAILED DESCRIPTION

In the following text, an execution unit may, in this instance, designate both a processor/core/CPU, as well as an FPU (floating point unit), a DSP (digital signal processor), a coprocessor or an ALU (arithmetic logical unit). The present invention relates to a multiprocessor system G60 shown in FIG. 1, having at least two execution units G10a, G10b and a comparison unit G20. Each of execution units G10a, G10b has at least one output to corresponding system interfaces G30a, G30b. Registers, memories or peripherals such as digital outputs, digital-to-analog converters and communication controllers are able to be controlled via these interfaces. The output signals of execution units G10a, G10b are able to be compared in comparison unit G20. In response to a difference, an error is detected and appropriate measures are able to be taken. The output data and/or addresses of the execution units are used for the comparison. Additional control signals may be submitted to a comparison. Independently of the selected output signals that are to be compared, we shall speak from here on of the piece of data that is to be compared to another piece of data.

Figure 1:
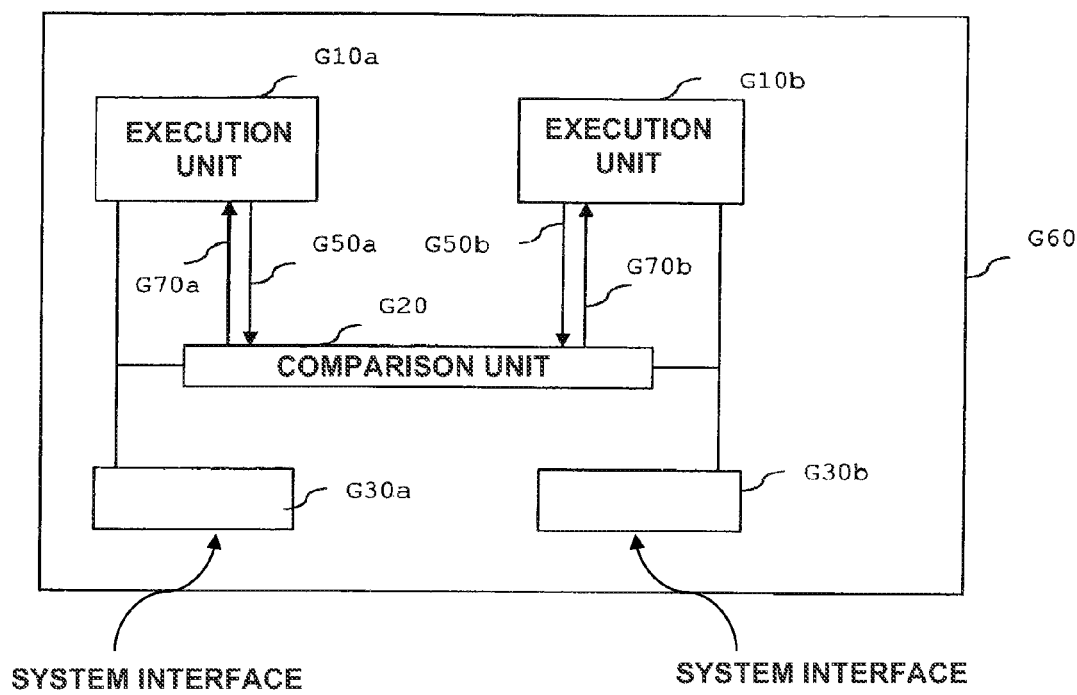
FIG. 1 shows a multiprocessor system G60 having two execution units G10a and G10b, as well as a comparison unit G20.

FIG. 1 shows a possible implementation for a multiprocessor system G60 having two execution units G10a and G10b. Comparison unit G20 is activated by a control signal G50a, G50b of execution units G10a, G10b. If an execution unit G10a, G10b wants to pass on a piece of data to system interface G30a or G30b without this being intended to be compared, this is passed on without setting signals G50a, G50b. Comparison unit G20 is thereby made unconcerned with these data. If an execution unit G10a, G10b wants to pass on a piece of data to system interface G30a or G30b, and if this piece of data is to be compared to a corresponding piece of data of the other execution unit G10a, Glob, then, in addition to the output signals of the execution unit that are required for a data transfer to the system interface, a signal G50a in the case of G10a, G50b in the case of G10b is generated for comparison unit G20. These signals G50a and G50b are also generated by execution units G10a and G10b. These signal to comparison unit G20 that the piece of data transmitted to the system interface, optionally with the appertaining address, is to be compared to a corresponding piece of data of the respective other execution unit. The comparison takes place when the other execution units also transmits a piece of data to its system interface, and when, in the process, it also signals to comparison unit G20 a comparison that is to be carried out. Signal G50a in the case of G10a, G50b in the case of G10b for the comparison does not necessarily have to be generated simultaneously with the transmission of the piece of data by the execution unit, but in such a way that the signal is able to be assigned unequivocally to this piece of data (including the address). Comparison unit G20 is in a position to stop the execution units temporarily, if necessary, via signals G70a, G70b. In this context, execution unit G10a is stopped via signal G70a and execution unit G10b is stopped via signal G70b. The execution units are stopped until the appropriate signals G70a and G70b are canceled again by the comparison unit.

Figure 2:
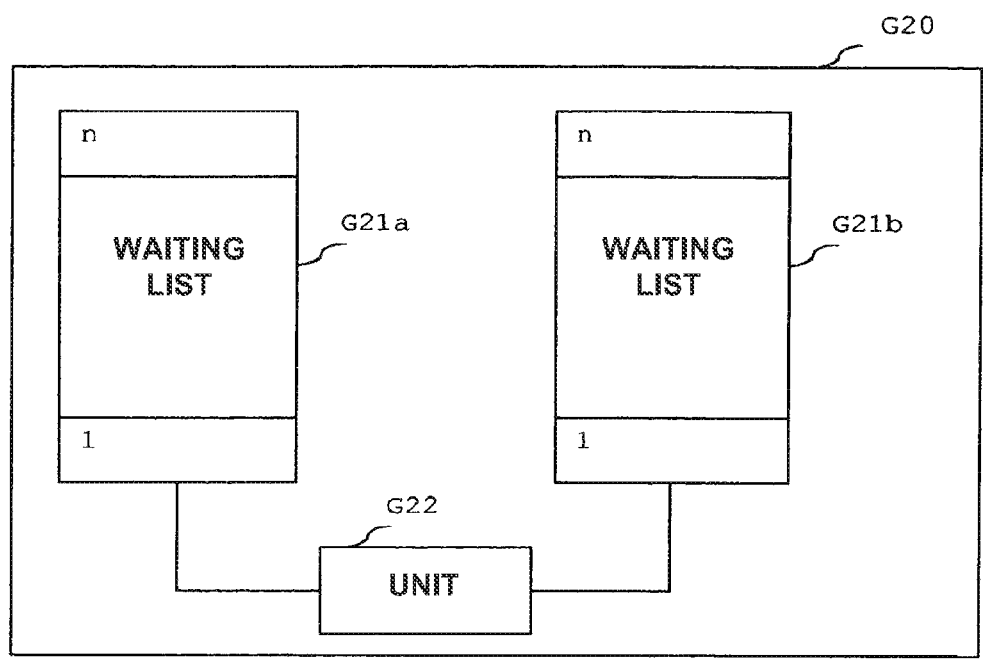
FIG. 2 shows a specific embodiment of a comparison unit G20 having two waiting lists G21a and G21b.

In a first specific embodiment shown in FIG. 2, a possible implementation of comparison unit G20 is described. For each connected execution unit, it has an internal waiting list. These waiting lists are constructed according to the FIFO principle (first in first out principle). In the implementation example shown in FIG. 2, these are waiting list G21a for execution unit G10a and waiting list G21b for execution unit G10b. A waiting list has n entries, but at least one. If an execution unit signals, for a piece of data, that it is to be compared, this piece of data is stored in an entry in the waiting list. If there is no more free entry present in the waiting list, the appertaining execution unit is stopped via signal G70a or G70b, respectively, shown in FIG. 1, until there is again a free entry in the waiting list. Alternatively, comparison unit G20 may generate an error signal if an execution unit tries to place an additional piece of data into a waiting list that is already full. If at least one entry is present in all waiting lists of G20, (in this instance, G21a and G21b), then, according to the FIFO principle, in each case the first, (time-wise the oldest) entries are compared to each other via unit G22. If the compared data are different, an error signal is then generated and the entries in the waiting lists are then ejected, that is, they are removed from them. In case the data are equal, they are also removed from the waiting lists. Alternatively, in the case of more than two waiting lists, a majority decision (voting) may be made. A common feature of this specific embodiment is that the data to be compared have to be supplied in the identical sequence of all connected execution units, so that they are sorted into the waiting lists in the correct sequence. For, the matter of which data are to be compared to which data is specified only via their position within the waiting lists. The closest to the front, or oldest entries within the waiting lists are always the ones to be compared.

Figure 3:
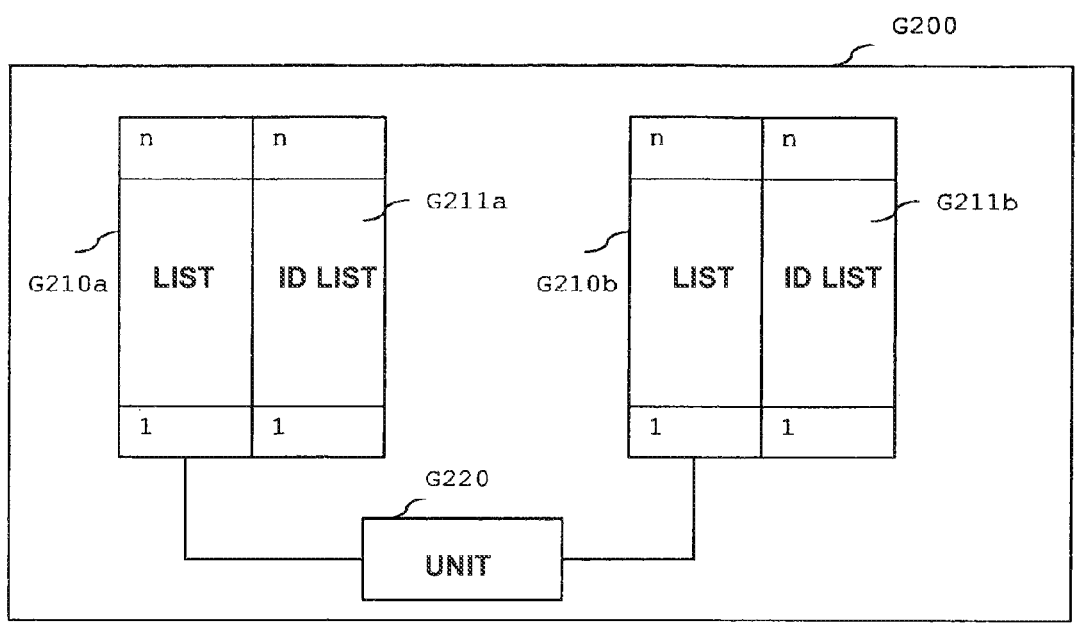
FIG. 3 shows a specific embodiment of a comparison unit G200 having two lists in each case, G210a, G211a and G210b, G211b.

An additional specific embodiment of comparison unit G20 is shown in FIG. 3, denoted there by G200. For each connected execution unit, comparison unit G200 has lists G210a, G210b, in which the piece of data to be compared is stored. In addition to lists G210a, G210b, further lists G211a, G211b exist, in which for every piece of data in lists G210a, G210b an unequivocal ID is stored. If a list is full, the respectively assigned comparison unit is stopped via signals G70a or G70b, respectively, shown in FIG. 1, or an error signal is triggered if the execution unit should attempt to place an additional piece of data into a list that is already full. A comparison of the data then takes place when, in all lists G210a, G210b data having appertaining identical ID's exist in lists G211a, G211b. The data are compared and in response to a difference an error signal is generated. If they are equal, they are transmitted to connected system interfaces G30a, G30b, or to G32 if the system interface is assigned to the comparison unit. After a comparison, independently of the result, the data are removed from lists G210a, G210b, and the appertaining ID's from lists G211a, G211b. If more than two lists exist, a majority decision may be made. It is a feature of this implementation that the data that are to be compared do not have to be supplied in the identical sequence by all connected execution units to comparison unit G20. Data are compared when data are present in both lists G210a and G210b, and at least two equal ID's are present in the ID lists.

What is claimed is:

1. A method for comparing data in a computer system having at least first and second execution units and a comparison unit, the method comprising:
   in each of the execution units, processing input data and generating output data;
   in the first execution unit, specifying to the comparison unit that a next piece of output data is to be compared to a piece of output data of the second execution unit; and
   in the comparison unit, comparing the two pieces of output data in response to the specifying.

2. The method according to claim 1, wherein the execution units process the input data independently of each other.

3. The method according to claim 1, wherein the specification that the next piece of output data is to be compared takes place by a comparison signal.

4. The method according to claim 3, wherein the comparison signal and the output piece of data that is to be compared are output in a mutually unequivocally assignable manner.

5. The method according to claim 4, further comprising:
   assigning an identifier to the piece of data that is to be compared, by which the comparison is triggered.

6. The method according to claim 1, wherein all of the execution units whose output data are to be compared signal this to the comparison unit.

7. The method according to claim 1, further comprising:
   buffering the output data that are to be compared via at least one buffer memory in a specifiable sequence.

8. The method according to claim 1, wherein the execution units process the input data independently of each other, and wherein the specifying that the next piece of output data is to be compared takes place by a comparison signal, and wherein the comparison signal and the output piece of data that is to be compared are output in a mutually unequivocally assignable manner.

9. The method according to claim 8, further comprising:
   assigning an identifier to the piece of data that is to be compared, by which the comparison is triggered.

10. The method according to claim 1, further comprising:
    buffering the output data that are to be compared via at least one buffer memory in a specifiable sequence;
    wherein all of the execution units whose output data are to be compared signal this to the comparison unit.

11. The method according to claim 10, further comprising:
    assigning an identifier to the piece of data that is to be compared, by which the comparison is triggered.

12. A device for comparing data in a computer system, comprising:
    a comparison unit; and
    at least first and second execution units, each of the execution units processing input data and generating output data, the first execution unit specifying to the comparison unit that a next piece of output data is to be compared to a piece of output data of the second execution unit,
wherein the comparison unit compares the two pieces of output data in response to the specifying.

13. The device according to claim 12, further comprising:
at least one buffer memory for buffering the data in a specifiable sequence, the data then being supplied to the comparison unit.

14. The device according to claim 13, wherein the buffer memory is a FIFO memory.

15. The device according to claim 12, wherein the execution units process the input data independently of each other.

16. The device according to claim 12, wherein the specifying that the next piece of output data is to be compared occurs via a comparison signal.

17. The device according to claim 16, wherein the comparison signal and the output piece of data that is to be compared are output in a mutually unequivocally assignable manner.

18. The device according to claim 17, wherein an identifier is assigned to the piece of data that is to be compared by which the comparison is triggered.

19. The device according to claim 12, wherein all of the execution units whose output data are to be compared signal this to the comparison unit.

20. The device according to claim 12, wherein the output data that are to be compared are buffered via at least one buffer memory in a specifiable sequence.

21. The device according to claim 12, further comprising:
at least one buffer memory for buffering the data in a specifiable sequence, the data then being supplied to the comparison unit, wherein the buffer memory is a FIFO memory, and wherein the execution units process the input data independently of each other.

22. The device according to claim 12, wherein the specifying that the next piece of output data is to be compared occurs via a comparison signal, and wherein the comparison signal and the output piece of data that is to be compared are output in a mutually unequivocally assignable manner.

23. The device according to claim 22, wherein an identifier is assigned to the piece of data that is to be compared by which the comparison is triggered, wherein the output data that are to be compared are buffered via at least one buffer memory in a specifiable sequence, and wherein all of the execution units whose output data are to be compared signal this to the comparison unit.

* * * * *